Feb. 22, 1944.    M. A. LEVY    2,342,409
DIAGNOSTIC REAGENT AND PROCESS
Filed Aug. 23, 1940
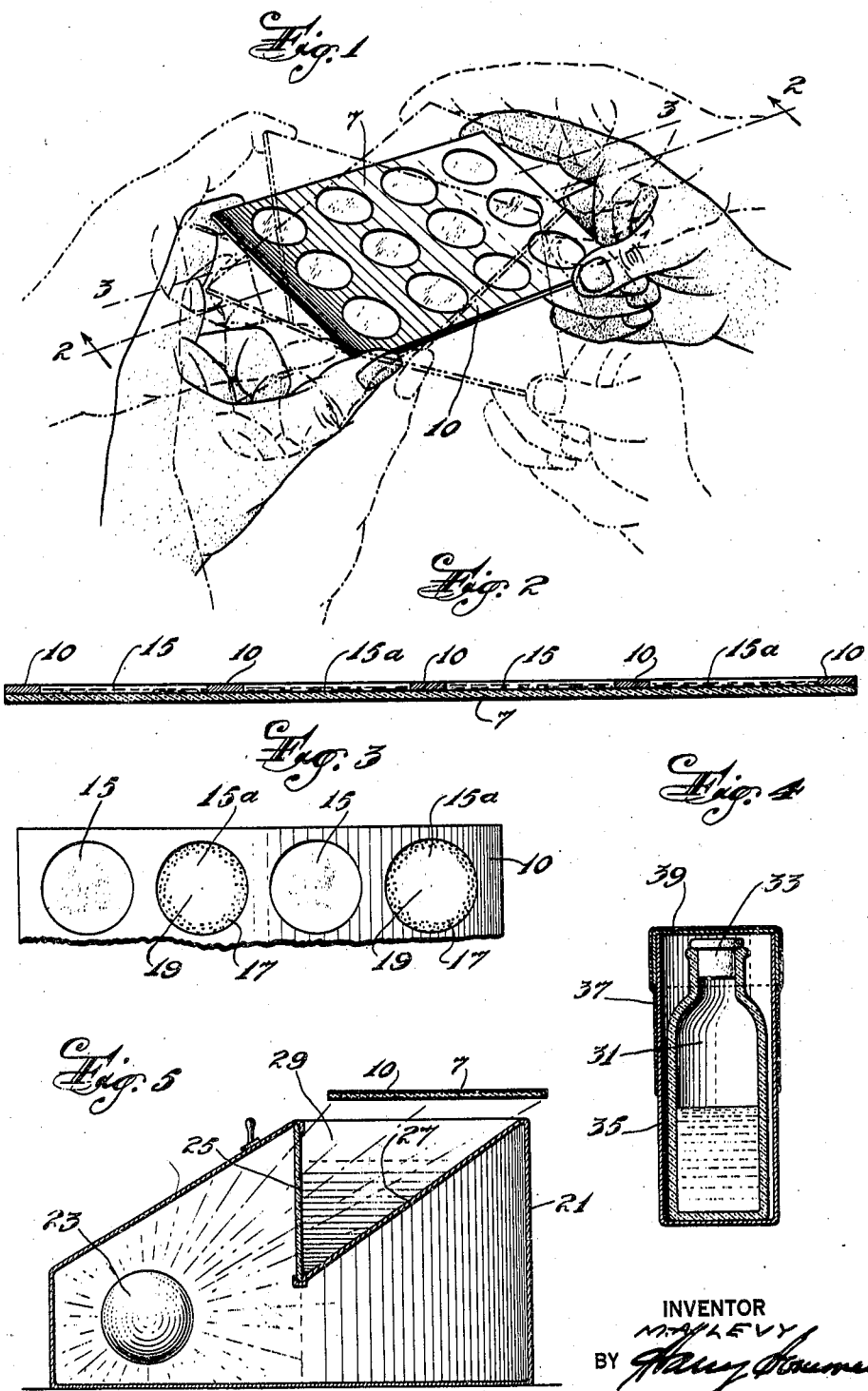

Patented Feb. 22, 1944

2,342,409

UNITED STATES PATENT OFFICE 2,342,409

DIAGNOSTIC REAGENT AND PROCESS

Meyer A. Levy, Newark, N. J.

Application August 23, 1940, Serial No. 353,785

6 Claims. (Cl. 167—78)

In accordance with the present invention, there are provided certain improvements in rapid methods employed for the diagnosis of syphilis.

Serological tests for diagnosis for syphilis fall into two general classes: (1) Complement-fixation reactions and (2) precipitation reactions; the complement-fixation reactions are represented by the well-known Wassermann test, which is regarded as a standard.

However, the performance of the Wassermann test requires a considerable length of time, and in many instances, such as where transfusions are to be given, it becomes highly desirable, and even necessary, to have a quick method of testing specimens of a donor's blood. Consequently, the precipitation reactions afford a quick procedure to give an indication of the presence or absence of the *Spirochaeta pallida,* and all of such precipitation tests, of which there are several, are accurate when used in the presence of strongly positive or definitely negative specimens.

However, where the reactions are weak, the precipitation reactions, generally speaking, are not sufficiently accurate to make a diagnosis with a degree of certainty that is beyond reasonable doubt.

While, generally speaking, this is true, improvements in such reactions are being made rather continuously, and there has been developed a test which may be considered accurate in its diagnostic value, even when the reactions are weak.

This test, which gives probably the best results among the quicker tests for syphilis diagnosis, is the Kahn test.

In performing this test, there is prepared what is known as the Kahn antigen, which is prepared from beef heart, by preparing dried powdered beef heart muscle, free from fat, subjecting the dried muscle to a series of extractions with ether, and finally extracting the dried residue from the ether extractions with alcohol. The resulting antigen then is cholesterilized.

After preparation, the antigen must be titrated in the presence of physiological salt solution and corrected as to sensitiveness.

The sensitiveness of a newly prepared antigen may be greater or less than that of standard antigen. In either case it can be corrected readily to standard requirements, two reagents being necessary for antigen correction.

These reagents are (1) cholesterolized alcohol, and (2) sensitizing reagent.

The cholesterolized alcohol is prepared by the addition of 600 mgm. of cholesterol to 100 cc. of 95% alcohol, the mixture being heated until all the cholesterol is dissolved.

The sensitizing reagent is prepared from the ether filtrate obtained in the preparation of antigen from 50 grams of heart muscle. This ether filtrate is evaporated to about 10 cc. or less, whereupon the material is transferred to a small weighed evaporating dish, the evaporation then being continued until the odor of ether is no longer detectable.

Any water which may separate is removed, and the residue transferred to an extracting flask and extracted with absolute alcohol. The extraction being allowed to take place for about 10 minutes at room temperatures with frequent shaking of the glass.

The mixture then is refrigerated, filtered while cold, and then incubated at 37 degrees C. for about 24 hours. The filtrate is allowed to stand for three days at room temperature and filtered if necessary.

The clear filtrate is cholesterolized with 6 mg. cholesterol per cc. of the filtrate. The resulting extract is filtered and ready for use.

When used, there is prepared a series of emulsions of the extract by mixing designated amounts of antigen with salt solution. This suspension or emulsion then is mixed with serum in three different proportions, for example, in one test tube 0.05 cc. of antigen emulsion is mixed with 0.15 cc. of serum, in a second tube 0.025 cc. of antigen suspension is mixed with 0.15 cc. of serum, and in a third tube 0.0125 cc. of antigen emulsion is mixed with 0.15 cc. of serum.

In preparing the emulsion, assuming the titer of the antigen being used is 1 cc. of antigen plus 1.1 cc. salt solution, the antigen emulsion is prepared by measuring 1.1 cc. salt solution in a standard antigen suspension vial, measuring 1 cc. of antigen into a similar vial, mixing by pouring the salt solution into the antigen and, as rapidly as possible, without waiting to drain the vial, by pouring the mixture back and forth for about six times to ensure thorough mixing. This antigen emulsion is allowed to stand for about 10 minutes before using.

After standing for the requisite 10 minutes, the emulsion is shaken well and 0.05, 0.25 and 0.0125 cc. amounts thereof for each serum are measured into the respective test tubes, the emulsion being delivered to the bottom of the tubes.

To the emulsion in the respective tubes there is added 0.15 cc. of serum to each tube, the serum being added as soon as possible after the antigen emulsion has been pipetted.

The tubes then are shaken vigorously for about 10 seconds to assure thoroughly mixing of the ingredients. The tubes then are shaken for a standard shaking period of three minutes at speeds of from 275 to 285 oscillations per minute with a stroke of 1.5 inches. It is found in practice that the maintenance of these conditions importantly affects the accuracy of the results.

After shaking, 1 cc. of salt solution is added to the tube containing the 0.5 cc. of antigen emulsion and 0.5 cc. to the remaining tubes, all of which tubes are shaken sufficiently to mix the ingredients.

With four plus reactions, definitely visible particles become suspended in a transparent or opalescent medium. The individual particles are visible readily by direct examination, without lifting the tubes from the rack.

Three plus reactions show also definitely visible particles which are less clear-cut than in four plus reactions. The particles are not always distinguishable until the tube is lifted from the rack and examined individually.

Two plus reactions show finer particles suspended frequently in a somewhat turbid medium, the particles not being distinguishable until the tube is examined individually, usually by slanting.

One plus reaction show still finer particles, suspended in a somewhat turbid medium.

Doubtful reactions show extremely fine particles just within the visible range, suspended in a somewhat turbid medium.

In negative reactions, the medium is transparent and opalescent and free from visible particles.

The above procedure has certain disadvantages. Thus, importantly, the antigen emulsions are stable for only about 30 minutes after preparation thereof. Also, the requisite shaking is disadvantageous owing to the possibility of breakage or loss of material from various causes.

The present invention has for one of its objects to provide certain improvements over the above-outlined procedure.

A further object of the invention is to produce an improved antigen of the Kahn type, but which will produce emulsions that are sensitive over indefinitely long periods of time without becoming over-sensitive.

A further object of the invention is to provide an improved operating technique which eliminates the above-mentioned objectionable shaking, and which improves the speed of test.

Further objects of the invention will become apparent as the description proceeds, and the features of novelty will be pointed out in particularity in the appended claims.

In accordance with the present invention a modified Kahn antigen is prepared by incorporating gum mastic in standard Kahn antigen, two grams of gum mastic being dissolved in 100 cc. of standard Kahn antigen.

The solution is effected preferably by placing the materials in a 250 cc. Erlenmeyer flask which is tightly stoppered with a cork covered with tinfoil. When the mastic has gone into solution, the turbid antigen is filtered through fat-free filter paper into another flask. The clear filtrate represents the improved antigen of the present invention, and is referred to hereinafter as antigen-mastic.

If it be desired to add a dye to the material, an amount of Sudan IV equivalent to about 1 mg. per cc. of solution is added to the antigen-mastic in the flask. To ensure complete saturation, the flask is tightly stoppered and immersed in a water bath for about 10 minutes, the bath being heated to about 50 degrees C.

The resulting solution is filtered through fat-free filter paper into a brown glass bottle. The clear deep-red solution is a stock antigen-mastic (with dye), and if stored at room temperatures in the dark, it will keep indefinitely.

Before setting up titration, the stock antigen-mastic is allowed to stand at room temperature for a day or two.

As is the case when standard Kahn antigen is to be used, the present improved antigen must be titrated before it is used. The purpose of the titration is to determine what amount of 5% salt (sodium chloride) solution, when added to 1 cc. of antigen-mastic, will give an emulsion of suitable thickness and sensitivity. The titer, once determined, remains the same for the life-time of that particular antigen-mastic unless there is undue evaporation. If negative controls begin to appear granular after the emulsion has been in use for a few days, the titration should be repeated with larger amounts of 5% salt solution.

In carrying out the titration, two rows of test tubes, five in each row, are set up in a rack. Both rows of tubes are numbered 1-5. Tube 1 of the back row receives 3 cc. of 5% salt solution, tube 2 receives 3.5 cc., tube 3 receives 4 cc., and so on to tube 5 which gets 5 cc. Each tube of the front row receives 1 cc. of the stock antigen-mastic. Before mixing stock antigen-mastic and salt solution, greater stability of the active antigen may be obtained by heating the stock antigen-mastic (only) for 5 minutes at 60 degrees C.

Now, the contents of tube 1 of the back row are poured quickly into tube 1 of the front row, and the resulting emulsion is poured back and forth several times. This is repeated with the other four sets of antigen-mastic and salt solution. The five emulsions then are tightly stoppered with corks covered with tinfoil, and set aside at room temperature for thirty-six hours (or longer where a more stable emulsion is desired).

At the end of this time, there will be complete precipitation in one or two of the tubes having the smaller amounts of salt solution. The largest amount of 5% salt solution causing complete precipitation is taken as a titer of the antigen-mastic. Where the antigen-mastic with dye has been used, the supernatant fluid may show a slight trace of pink even where precipitation is complete. For example, if the emulsions made with three, 3.5 and 4 cc. sodium chloride show complete separation after 36 hours, whereas the emulsion made with 4.5 cc. shows only partial precipitation, the titer is 4 cc. of 5% salt solution to 1 cc. of antigen-mastic. A further titration with amounts of salt solution varying from 4 to 4.5 cc. may be set up if desired, but this is not absolutely necessary.

At this point the sensitivity of the emulsion is determined by a series of tests with known negative and weakly positive sera. If satisfactory Kahn antigen had been used in the preparation of antigen-mastic, the emulsion made from the latter, using the proper titer, will always prove to be sufficiently sensitive. The smallest amount of antigen-mastic that should be used for emulsification is 0.5 cc., and the emulsion remains satisfactory for a month or longer.

This contrasts very decidedly with the maximum sensitivity of 30 minutes encountered when using standard Kahn antigen. It may be noted that the stability of the active emulsion is directly dependent upon the amount of 5% NaCl used and the length of time required for complete precipitation of the antigen-mastic. The greater the amount of salt solution used the longer the time required for complete precipitation and the greater the stability of the end product. It is also true that the greater the amount of salt solution used, over a certain point, the lesser the degree of sensitivity of the active emulsion.

In carrying out the tests, test slides are used. For the preparation of these slides, lantern slide cover glasses serve the purpose well, such slides being about 4" x 3¼", and when prepared in accordance with the instruction given hereinafter, each slide will permit the performance of 12 tests at a time including a negative and positive control.

In preparing the test slides, one surface of the slide is covered with three parallel one inch strips of adhesively coated masking tape.

When the strips of tape are applied, four circles, ⅝" in diameter are cut out of each strip. The tape is now lifted carefully off the slide leaving the circular pieces adhering to the slide. The surface of the slide around these adherent circular portions of the tape is covered with two or three coats of a suitable quick drying white enamel, each coat being permitted to dry before another coat is applied. The circles of tape are then removed, so that the finished slide shows a glossy white surface having 12 clear circular areas which define recesses in which the test is made.

When the test is to be made, the collected blood is permitted to clot on the test tube and then centrifuged. The serum is removed with a capillary pipette and discharged into a numbered tube. The pipette should be rinsed thoroughly in physiological salt solution before it is used again. It is found that inactivation of the serum generally is not necessary, but in a few cases inactivation (30 minutes) at 56° C. may change weakly positive reaction to one slightly more positive, but it never caused sera, negative before inactivation, to give results other than negative after inactivation. Hemolysis does not interfere with the test so long as the serum is clear.

Before testing any sera the tube containing the emulsion should be inverted several times to ensure complete dispersion of the precipitate. When not in use, the emulsion should be stopped carefully with a tight fitting cork covered with tinfoil.

In carrying out the tests, 0.05 cc. of serum, or a drop which is approximately this amount, is pipetted into one of the clear depression areas of the test slide. A negative and a positive control is included with each test or group of tests. By the use of a capillary pipette with a tip measuring about 1 mm. in diameter, a drop of emulsion is added to each drop of serum. The emulsion pipette should be rinsed after use in physiological salt solution and immersed in a tube containing fresh salt solution. Before it is put into use again as much as possible of the salt solution should be expelled.

After the addition of the emulsion, the slide is shaken by hand for five minutes. The rate of speed employed in the shaking should be such as to assure complete mixing of the reagents, but yet one that is not great enough to force the liquid out of the retaining depressions.

At intervals, the slide is held over a viewing box. A strong positive reaction will become apparent in about 1 to 2 minutes, while a weaker reaction will require 3 to 5 minutes. If at the end of 5 minutes there is no visible agglutination, the result is negative. All readings are made with the naked eye.

It will be understood that the term "salt solution" wherever employed in the specification and claims is intended to refer to a solution of sodium chloride or its equivalent.

In interpreting the results of the test, both the time required for the clumping to begin and the size of the ultimate particles should be used as indices in the determination of the strength of the reaction. With a strongly positive serum clumping begins very shortly after the shaking begins. As the shaking continues the clumps become larger and larger and eventually move to the periphery of the circular depression which contains the fluid, leaving a clear center.

In weaker reactions, the clumps take longer to form, are not as large, and are suspended in liquid which is more or less clear depending on the strength of the reaction. A negative reaction shows a milky emulsion with a trace of pink (if dye had been used) but no visible particles.

Spinal fluid may be examined in the same manner as blood serum; and with the present improved method, advanced stages of neutro-syphilis are detected easily.

In practice, results obtained with the present test over a prolonged period of time show substantial identity of agreement with the Kahn test. Because of the speed and ease of performance and because of the high degree of specificity, the present antigen-mastic method is suitable especially for use in small hospitals or laboratories. In large hospitals where many transfusions take place the presence of the antigen-mastic emulsion makes the immediate examination of blood donors a simple matter.

The invention will be understood more readily by reference to the accompanying drawing, wherein:

Fig. 1 is a perspective view of the test slide used in carrying out my invention, shown held in position for tilting by hand for mixing of the serum and antigen.

Fig. 2 is an enlarged transverse sectional view taken on line 2—2 of Fig. 1,

Fig. 3 is a fragmentary top plan view taken at 3—3 of Fig. 1,

Fig. 4 is a vertical transverse sectional view of the complete antigen-mastic package in its preferred form, and Fig. 5 is a transverse sectional view through a view box for revealing the results of the test slide.

Referring more particularly to the drawing, 7 represents a test slide, a surface thereof being first covered with the three parallel tapes or strips, referred to above, adhesively secured thereto, each strip having four circular portions cut therein so that when the strips are moved, the circular tape portions adhere to the glass slide 7. A quickly drying enamel 10 then is applied to the glass slide except for the adhering circular portions of tape, the enamel being built up flush with the tops of the pieces of tape. The enamel is indicated at 10, Fig. 2, on an enlarged scale, one coat of enamel being allowed to dry before another is applied. When the circular pieces of tape are removed, they leave corresponding transparent recesses 15, 15a, defined by the enamel coating 10.

In making a test, a drop of known negative control or standard is pipetted into one of the transparent recesses 15, a drop of antigen-mastic emulsion is added thereto; and then a drop of serum to be tested is pipetted into another of the recesses, 15a, representing a test recess, and a drop of antigen-mastic emulsion is added thereto. The slide is shaken or tilted to effect mixing of the components (as indicated in Fig. 1).

The negative control remains a uniform milky emulsion; but if the serum tested is positive, red clumps soon are seen at the periphery 17 of the test area of 15a, leaving the center 19 clear.

At intervals, the slide is held over a view box 21, light from a source 23 passing through a shutter 25 and being reflected by a surface 27 through the aperture 29 over which fits the slide 7, the viewing being done through the agency of the light transmitted through the transparent areas 15, 15a of the slide.

The diagnostic character of the results has been pointed out above herein, and the close agreement of the results obtained by the present improved technique in hundreds of cases with the results obtained with the Wassermann and standard Kahn procedures indicates a high degree of specificity. An emulsion made as described above with the improved antigen-mastic remains satisfactorily sensitive for a comparatively long time (up to as long as a month or more, with or without inclusion of a dye in the emulsion, as compared with the maximum of thirty minutes using similar emulsions prepared with standard Kahn antigen), and reactions between the improved antigen-mastic and sera are clear cut and easily differentiated. It is found that inactivation of the serum generally is not necessary, but in a few cases inactivation (30 minutes) at 56° C. may change weakly positive reaction to one slightly more positive, but it never caused sera, negative before inactivation, to give results other than negative after inactivation.

Fig. 4 illustrates a preferred manner of packaging the antigen-mastic of the present invention.

The antigen-mastic is placed in small bottles such as that shown at 31 provided with a cork 33, the bottle 31 being packed in a metal tube 35 having a cap 37 and sealed with adhesive tape 39.

In addition to the above described technique it may be noted that a macroscopic test-tube test may be performed with the present improved antigen-mastic emulsion containing a dye as described above herein.

In carrying out this test-tube test 0.05 cc. of the antigen-mastic emulsion is pipetted into test tubes of suitable dimensions, for example: (3 x ½ or 4 x ½ inches). One tube is used for a single test. To each tube is added 0.15 cc. of the clear patient's serum. A positive and negative control is included with each group of tests. The tubes are then mixed by hand for about 10 seconds and centrifuged at a fair rate of speed for about 5 minutes. At the end of this time 1 cc. of physiological salt solution (0.85%) is added to each tube and the centrifuging continued for a minute or two. The tubes are then removed and the reactions read by noting the presence or absence of a red precipitate at the bottom of the tube and the presence or absence of pink cloudiness in the supernatant fluid. A negative reaction will show no precipitate and a somewhat turbid pink solution. A strong reaction will show a red precipitate and a water-clear supernatant fluid.

While the invention has been described specifically by the use of Kahn antigen, this being a simple method by which the lipoids may be extracted from dried beef heart, it will be understood that the invention may be employed with any lipoidal solution fortified with cholesteral.

The showings of the drawing are intended to be only illustrative in character, and not in any sense to have any limiting interpretation placed thereon; nor is the foregoing description inflexible in its details, as obviously variations in operating details may occur to the various technicians and operators without departing from the spirit of the invention.

Having thus described my invention what I claim as new and desire to secure by Letters Patent is:

1. The process of producing an activated reagent of long-lasting specificity for the diagnostic detection of syphilis, which comprises dissolving gum mastic in Kahn antigen in the relative proportion of approximately two grams of gum mastic to 100 cc. of Kahn antigen, thereby producing a substantially 2% solution of gum mastic in standard Kahn antigen, determining the titer and sensitivity of the resulting material and producing an emulsion of the said material in substantially 5% salt solution by mixing the material with the salt solution and effecting a slow and substantially complete precipitation of the material in the salt solution, the resulting emulsion satisfactorily preserving its sensitivity and specificity over prolonged periods of time.

2. The process of producing an activated reagent of long-lasting sensitiveness and specificity for the diagnostic detection of syphilis, which comprises dissolving gum mastic in Kahn antigen in the relative proportion of approximately two grams of gum mastic to 100 cc. of Kahn antigen, thereby producing a substantially 2% solution of gum mastic in standard Kahn antigen, increasing the stability of the resulting antigen-mastic solution by heating the same for approximately five minutes at substantially 60° C., titrating the thus-stabilized antigen-mastic solution, and producing an emulsion of the antigen-mastic solution in salt solution by mixing the solutions in accordance with the titer of the antigen-mastic solution, and allowing complete precipitation of antigen-mastic to proceed.

3. A stock reagent for diagnostic detection of syphilis, which comprises cholesterolized standard Kahn antigen containing effective amounts up to about 2% of gum mastic produced according to the process of claim 1.

4. The process of producing an activated reagent for use in the macroscopic detection of syphilis which comprises preparing an antigen mastic in solution in the relative proportions of approximately 2 grams of mastic in 100 cc. of Kahn antigen, filtering the solution, and titrating the filtrate with a salt solution to produce an activated antigen mastic precipitate of suitable thickness and sensitivity, having the characteristic of long-standing specificity.

5. The process of producing an activated reagent for use in the macroscopic detection of syphilis which comprises preparing an antigen mastic solution in the relative proportions of approximately 2 grams of mastic in 100 cc. of Kahn antigen, filtering the solution, titrating the filtrate with a salt solution, and then storing the same at room temperature in tightly stoppered containers for 36 hours, to produce an activated antigen mastic precipitate of suitable thickness and sensitivity, having the characteristic of long-standing specificity.

6. An activated reagent for use in the diagnostic detection of syphilis, made from a solution of antigen mastic in the relative proportions of approximately 2 grams of mastic in 100 c. c. of Kahn antigen, the solution being filtered and stored at room temperature for 24 hours and being then mixed with salt solution in amount sufficient to precipitate completely the antigen mastic material.

MEYER A. LEVY.